United States Patent
Mahmoudi et al.

(10) Patent No.: US 12,456,893 B2
(45) Date of Patent: Oct. 28, 2025

(54) ELECTRIC MOTOR WITH UNVARNISHED END WINDING FOR STATOR

(71) Applicant: Atieva, Inc., Newark, CA (US)

(72) Inventors: Mohammad Mahmoudi, Fremont, CA (US); Emad Dlala, Pleasanton, CA (US); Anandakumar Subbiah, Newark, CA (US); Sahil Rahimi, Union City, CA (US)

(73) Assignee: Atieva, Inc., Newark, CA (US)

( * ) Notice: Subject to any disclaimer, the term of this patent is extended or adjusted under 35 U.S.C. 154(b) by 198 days.

(21) Appl. No.: 18/456,876

(22) Filed: Aug. 28, 2023

(65) Prior Publication Data
US 2024/0072590 A1 Feb. 29, 2024

Related U.S. Application Data

(60) Provisional application No. 63/373,837, filed on Aug. 29, 2022.

(51) Int. Cl.
| | |
|---|---|
| *H02K 3/12* | (2006.01) |
| *H02K 1/16* | (2006.01) |
| *H02K 3/30* | (2006.01) |
| *H02K 9/19* | (2006.01) |

(52) U.S. Cl.
CPC ............. *H02K 3/12* (2013.01); *H02K 1/16* (2013.01); *H02K 3/30* (2013.01); *H02K 9/19* (2013.01)

(58) Field of Classification Search
CPC .. H02K 1/16; H02K 3/12; H02K 3/30; H02K 9/19
USPC ........................................................ 310/179
See application file for complete search history.

(56) References Cited

U.S. PATENT DOCUMENTS

| | | | | |
|---|---|---|---|---|
| 5,845,389 A | * | 12/1998 | Roberts | H02K 3/12 |
| | | | | 29/598 |
| 6,489,701 B1 | * | 12/2002 | Gamble | H02K 3/24 |
| | | | | 310/55 |
| 6,515,383 B1 | * | 2/2003 | Ognibene | H02K 9/225 |
| | | | | 310/52 |
| 7,498,713 B2 | | 3/2009 | Higashino et al. | |

(Continued)

FOREIGN PATENT DOCUMENTS

JP 2015216726 A 12/2015

OTHER PUBLICATIONS

Selema et al.: "Electrical Machines Winding Technology: Latest Advancements for Transportation Electrification," Machines 2002, 10, 563, Jul. 12, 2022, 29 pages.

(Continued)

*Primary Examiner* — Rashad H Johnson
(74) *Attorney, Agent, or Firm* — Brake Hughes Bellermann LLP (57) ABSTRACT

An electric motor comprises: a rotor; a stator comprising a stack of laminations, wherein windings of the stator comprise wires that have individual insulation, the wires forming slot windings positioned in slots of the stator, the wires further forming end windings positioned outside the slots at each end of the stator; varnish in the slots of the stator, the varnish contacting the laminations and the slot windings, and wherein the varnish does not contact the end windings of at least one of the ends of the stator; and a cooling system to apply liquid coolant to at least the end windings, wherein the liquid coolant passes between the wires of the end windings.

15 Claims, 6 Drawing Sheets

(56) References Cited

U.S. PATENT DOCUMENTS

| | | | |
|---|---|---|---|
| 9,762,106 B2 | 9/2017 | Gauthier et al. | |
| 10,128,701 B2 | 11/2018 | Dlala et al. | |
| 10,683,920 B2 | 6/2020 | Palfai et al. | |
| 10,797,562 B2 | 10/2020 | Dlala et al. | |
| 11,133,719 B2 | 9/2021 | Mayer et al. | |
| 2002/0011753 A1* | 1/2002 | Asao | H02K 15/12 310/201 |
| 2003/0001441 A1 | 1/2003 | Peterson et al. | |
| 2003/0173840 A1 | 9/2003 | Seniawski et al. | |
| 2012/0032551 A1 | 2/2012 | Yoneda et al. | |
| 2012/0267967 A1* | 10/2012 | Trago | H02K 5/10 310/43 |
| 2013/0002067 A1* | 1/2013 | Bradfield | H02K 3/38 310/59 |
| 2013/0140924 A1* | 6/2013 | Glubrecht | H02K 1/20 310/59 |
| 2013/0207492 A1* | 8/2013 | Chamberlin | H02K 3/38 310/59 |
| 2013/0249334 A1 | 9/2013 | Kitta et al. | |
| 2015/0022032 A1* | 1/2015 | Hoyland | H02K 3/47 310/43 |
| 2015/0108857 A1* | 4/2015 | Takahashi | H02K 9/19 310/208 |
| 2015/0326086 A1* | 11/2015 | Takahashi | H02K 3/34 310/45 |
| 2016/0105065 A1* | 4/2016 | Takahashi | H02K 1/243 310/83 |
| 2018/0342919 A1* | 11/2018 | Huang | H02K 3/22 |
| 2020/0169136 A1* | 5/2020 | Sercombe | H02K 21/16 |
| 2021/0347245 A1 | 11/2021 | Dlala et al. | |
| 2022/0158512 A1 | 5/2022 | Deshpande et al. | |
| 2022/0239199 A1* | 7/2022 | Salam | H02K 9/223 |
| 2023/0011641 A1* | 1/2023 | Keum | H02K 3/24 |
| 2023/0134509 A1* | 5/2023 | Leonardi | H02K 3/30 310/179 |
| 2024/0046007 A1* | 2/2024 | Tikadar | G06F 30/23 |
| 2024/0072590 A1* | 2/2024 | Mahmoudi | H02K 1/16 |
| 2024/0213839 A1* | 6/2024 | Vogt | H02K 1/165 |
| 2024/0250572 A1* | 7/2024 | Zhang | H02K 1/16 |
| 2024/0258857 A1* | 8/2024 | Kuehbacher | H02K 3/50 |
| 2024/0258858 A1* | 8/2024 | Kuehbacher | H02K 9/19 |
| 2024/0339872 A1* | 10/2024 | Koizumi | H02K 1/16 |
| 2024/0364152 A1* | 10/2024 | Sever | H02K 3/345 |
| 2025/0119015 A1* | 4/2025 | Lahrman | H02K 9/197 |
| 2025/0125689 A1* | 4/2025 | Suter | H02K 3/345 |

OTHER PUBLICATIONS

International Search Report and Written Opinion for PCT Application No. PCT/US2023/072987; mailed on Nov. 24, 2023; 19 pages.
"What Are Wire Enamels | Electrical Insulation | Axalta Energy Solutions", The Wayback Machine; https://web.archive.org/web/20200509043423/https://www.axalta.com/electricalinsulation_global/en_us/wire-enamels/what-are-wire-enamels.html, Sep. 11, 2023, 4 pages.

* cited by examiner

ELECTRIC MOTOR WITH UNVARNISHED END WINDING FOR STATOR

CROSS-REFERENCE TO RELATED APPLICATION

This application claims benefit, under 35 U.S.C. § 119, of U.S. Provisional Patent Application No. 63/373,837, filed on Aug. 29, 2022, entitled "ELECTRIC MOTOR WITH UNVARNISHED END WINDING FOR STATOR", the disclosure of which is incorporated by reference herein in its entirety.

TECHNICAL FIELD

This document relates to an electric motor with at least one unvarnished end winding.

BACKGROUND

A typical stator of an electric motor consists of winding coiled around the iron core to produce the stator. The part of the winding that is outside the core on either side is called the end-winding. Stator windings have been impregnated with liquid-based resin or varnish that provides a layer of resin in the slots and also over and through the end windings. Such varnish typically deeply penetrates every layer of the wires and stator slots, and is sometimes referred to as secondary insulation.

Secondary insulation has been used to serve multiple purposes. First, the mechanical structure of the windings is improved because the windings are glued to each other and to the body of the stator. Second, electrical insulation of the wires can be improved. Third, the varnish increases the thermal mass of the stator.

SUMMARY

In a first aspect, an electric motor comprises: a rotor; a stator comprising a stack of laminations, wherein windings of the stator comprise wires that have individual insulation, the wires forming slot windings positioned in slots of the stator, the wires further forming end windings positioned outside the slots at each end of the stator; varnish in the slots of the stator, the varnish contacting the laminations and the slot windings, and wherein the varnish does not contact the end windings of at least one of the ends of the stator; and a cooling system to apply liquid coolant to at least the end windings, wherein the liquid coolant passes between the wires of the end windings.

Implementations can include any or all of the following features. The varnish does not contact either of the end windings. A cross section profile of the wires is rectangular. A cross section profile of the wires is round. The end windings form a continuous wave pattern relative to the slots of the stator. The end windings are hairpin windings. The individual insulation comprises at least a first layer that covers each of the wires, and a second layer that covers the first layer. The first layer comprises enamel. The second layer comprises a resin. The varnish comprises a resin.

In a second aspect, an electric motor comprises: a rotor; a stator comprising a stack of laminations, wherein windings of the stator comprise wires that have individual insulation, the wires forming slot windings positioned in slots of the stator, the wires further forming end windings positioned outside the slots at each end of the stator; varnish in the slots of the stator, the varnish contacting the laminations and the slot windings; and means for applying liquid coolant to at least the end windings so that the liquid coolant passes between the wires of the end windings.

BRIEF DESCRIPTION OF DRAWINGS

Like reference symbols in the various drawings indicate like elements.

DETAILED DESCRIPTION

This document describes examples of systems and techniques that provide an electric motor with an unvarnished end winding. In some implementations, the resin is omitted from the end windings, allowing the individually insulated wires to come in direct contact with a cooling medium such as motor oil (e.g., automatic transmission fluid). This can enhance thermal management of end windings, allowing for better heat extraction, higher thermal performance and the motor being able to sustain more peak torque at each time interval or sustain a given peak torque for a longer time interval. For example, the amount of exposed winding area at the end winding can be increased, and the thermal resistance of the heat path from the wires to the cooling medium can be reduced. As such, the windings, and thereby the stator as a whole, can be cooled significantly faster; sustained high torque can be achieved; and/or performance criteria (e.g., 0-60 mph times or quarter-mile race times or speeds) can be substantially improved.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons.

Examples described herein refer to an electric motor. An electric motor as used herein can be any type of electric motor, including, but not limited to, a permanent-magnet motor, an induction motor, a synchronous motor, or a reluctance motor.

Examples described herein refer to a top, bottom, front, or rear. These and similar expressions identify things or aspects in a relative way based on an express or arbitrary notion of perspective. That is, these terms are illustrative only, used for purposes of explanation, and do not necessarily indicate the only possible position, direction, and so on.

Generally, an electric motor can include a stator and rotor where the interaction of magnetic fields produced by each of these parts with appropriate currents results in torque at the rotor. The torque produced by the electric motor is directly related to the amount of current that can be passed through the winding. The magnet wire that is used to form the winding has a specified temperature rating (thermal index). The short duty torque production is defined by the amount of time that the current can be applied while keeping the winding below the specified temperature rating. In a highly power-dense motor, extracting heat from the winding is difficult. Effectively removing such heat increases the time at peak torque and/or the peak torque. Liquid cooling of the motor is one such effective mechanism to extract heat from the winding and improve motors short duty torque rating. For traction motors used in electric vehicles this has a direct impact on the vehicle performance metrics like 0-60 and quarter-mile times.

Varnishing is a process of applying varnish (e.g., resin) over the stator winding that fills the pockets of air in the end winding and between the slot winding and the stator stack. Resins used in varnishing have high dielectric strength, adhesive properties, and relatively better thermal conductivity than air. This improves the electrical insulation in the slot as well as heat conduction from the wire to stack. It also helps glue the winding to the stack to protect the winding from vibrations and potential damage caused by high frequency electromagnetic and mechanical forces acting on it during motor operation.

Commonly used methods of applying varnish include dip-and-bake, vacuum pressure impregnation (VPI) and a trickle coating process. For example, the entire stator can be preheated and then submerged in liquid varnish. These processes are typically designed to cover air pockets in the slot- and end winding to varying degrees with some providing more control over the coverage than others.

In some implementations, a tuned varnishing process is used that varnishes the slot windings while leaving the end winding(s) free of varnish. For example, the resin dispensing nozzles can be repositioned precisely at the target regions, or the end windings can be masked (e.g., for dip-and-bake or VPI processes). Advantages of the present subject matter can include, but are not limited to: Increasing the exposed winding area on the end winding, or reducing the thermal resistance of the heat path. This can improve the efficiency of heat extraction from end windings that are cooled by forced distribution of fluid.

In terms of architecture, a motor consists of a stationary and rotating parts referred to as stator and rotor with an airgap in between. The stator can be made of laminated steel sheets with slots, the laminates stacked to a required length. Round or bar-shaped copper conductors are inserted into the slots resulting in a portion of the winding extending out of the stack at each end of the stator. The slot conductors are connected to conductors in the other slots via end windings. The stator assembly then goes through a varnishing process to improve dielectric strength and thermal conductivity of the winding. Additionally, end windings allow the motor designer to establish different winding connections such as series/parallel or star/delta.

In terms of operation, the process of energy conversion from electrical to mechanical starts by injecting appropriate currents into the stator to establish a stator magnetic field. Depending on the motor topology, the rotor could have permanent magnets or windings or other conductors, any of which cause a rotor magnetic field. The interaction between these two magnetic fields from the stator and rotor results in the torque produced at the rotor which can be used to do any mechanical work in applications such as electric vehicle powertrains, fans, and pumps. The torque produced is proportional to the strength of the magnetic field established which in turn is directly proportional to the current injected into the stator. In other words, a high torque demand means that more current must pass through the stator windings. The increased current in turn causes a greater heat generation in the stator windings.

A significant portion of losses generated in the electrical to mechanical energy conversion process is heat generated due to resistive losses which is in square proportion to current ($i^2R$). The heat generated in the stator slots is conducted into the stack of stator laminations which is removed effectively by different methods such as a water jacket, oil cooling, or forced air, to name just a few examples. Since the end winding is typically surrounded by air, which is a poor conductor of heat, and because the winding insulation has a particular thermal rating, the stator current density is limited to a specified level which is typically around 20 amperes per square millimeter ($A/mm^2$). In traction applications, high torque at low speed may be desirable to achieve favorable high-performance metrics such as shorter times for accelerating from 0-60 mph or for completing a quarter-mile race. High current densities may be preferred to achieve higher torque, but the current densities are presently limited by the thermal bottleneck of the end winding.

Extracting heat from the stator can be a challenge, especially in an implementation of a highly power-dense motor. Successfully and effectively removing heat from the end winding can therefore provide significant advantages of satisfying high-traction power needs and increasing drive-unit power density. Due to the thermal rating of the winding insulation, the current density in the winding is often limited. The thermal rating can correspond to a thermal index and reflect the maximum temperature that the wire can handle before its electro-mechanical properties are compromised. As such, effectively removing heat can increase the amount of time that the motor can operate at peak torque, and/or can increase the level of the peak torque, both of which are highly significant performance characteristics.

Attempts at cooling the end winding have previously been made by bringing some cooling medium such as oil in contact with the winding. Because the end windings have been varnished in previous motors, the coolant has removed thermal energy when being heated by way of extracting heat from the end winding. The coolant may eventually drain into a sump of the motor installation. This may allow the stator to thermally withstand current densities up to about 30 $A/mm^2$.

In the present subject matter, the cooling of the end winding can be further enhanced with the help of a tuned varnishing technique that varnishes the slot windings while leaving the end winding unvarnished. This can be implemented either by repositioning the resin dispensing nozzles precisely at the target regions or by masking the end windings for a dip and bake or a VPI process. As a result, the winding area exposed to coolant (e.g., oil) can be significantly increased. Thermal resistance between the coolant and wire material (e.g., copper) can also appreciably be reduced compared to varnished end windings, where a composite of copper, insulation, and varnish may exist between the winding and oil. The efficiency of heat extraction from forced fluid cooled end windings can allow a derate strategy to be used that enables current density greater than about 60 $A/mm^2$ in some cases.

The inventors of the present subject matter have discovered that the mechanical, insulative, and thermal advantages associated with varnishing the end windings do not prevent use of a different approach in motor manufacturing where the end windings remain unvarnished. The thermal mass of the varnish that has previously been applied to end windings does provide a slight improvement in thermal performance because it allows heat to be transferred from the end windings to the varnish. However, this advantage may be realized only at transient load levels, such as when the motor operates at or near its full capacity, and even then the varnish may become saturated with thermal energy after the first transient. Moreover, applying the varnish to the end windings has the effect of significantly reducing the surface area of the end winding that is available for heat rejection. For example, rather than using the cumulative surface area of all the individual wires of the end winding for heat transfer, the varnished end winding may use only the exterior varnish surface, which can have a significantly smaller total area than the wires.

Figure 1:
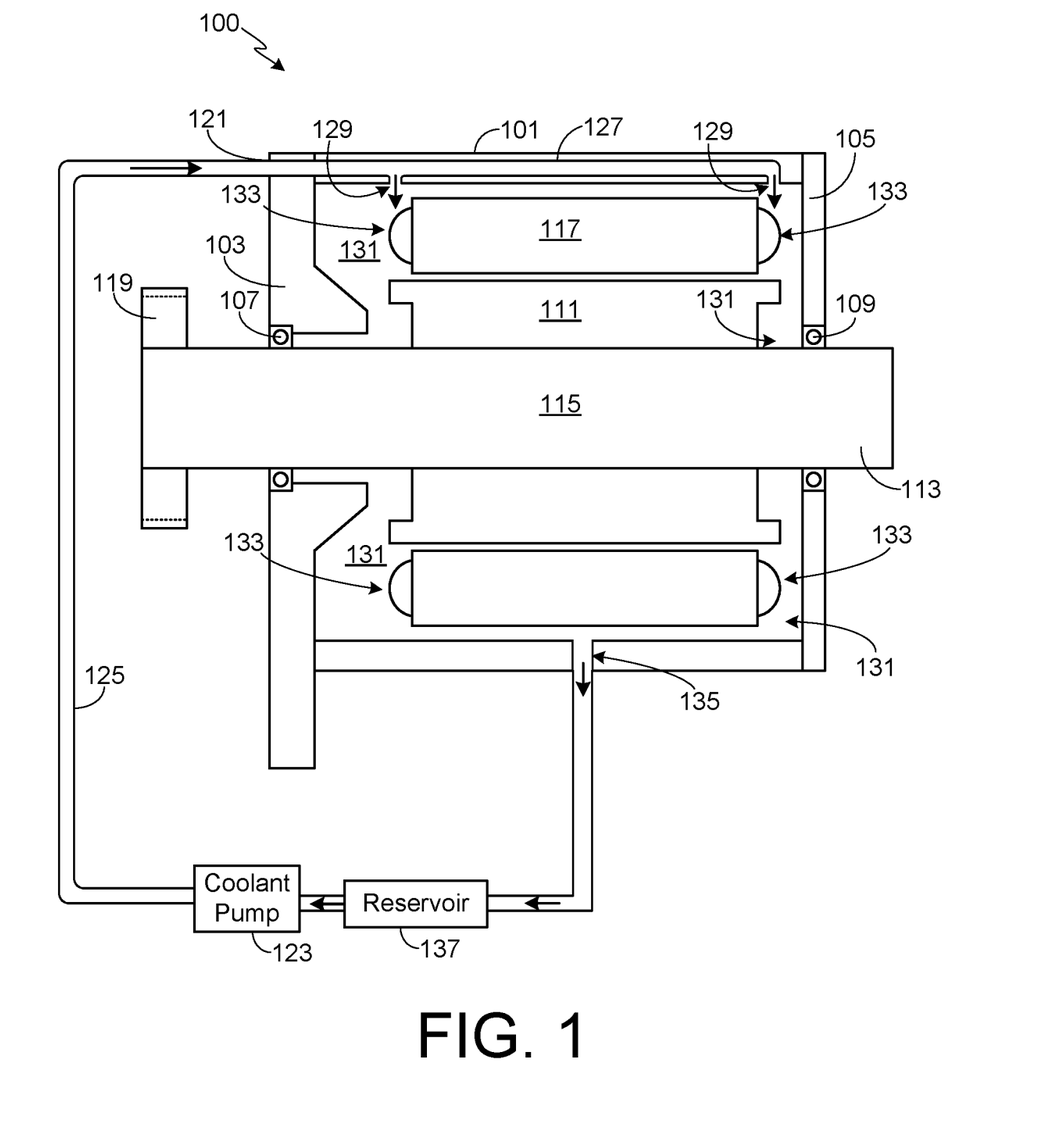
FIG. 1 shows a cross section of an example of an electric motor.

FIG. 1 provides a cross-sectional view of the primary elements of a motor and integrated cooling system 100. The motor and integrated cooling system 100 can be a coolant injection system that can inject coolant directly into the motor enclosure. In at least one embodiment, the motor housing is a multi-piece housing comprised of a cylindrical motor casing 101 that is mechanically coupled to front and rear end caps 103 and 105, respectively. The motor's core assembly, which is supported on either end by bearing assemblies 107 and 109, includes a rotor 111 and a rotor shaft 113. A center portion 115 of rotor shaft 113 can be hollow. Also visible in this figure is a stator 117.

At one end of rotor shaft 113 is a drive gear 119. Although not shown in this figure, drive gear 119 can be contained within a gearbox (i.e., gear housing). The gearbox may be separate from the motor; alternately, the gearbox or at least one wall of the gearbox may be integral with front end cap 103.

Integrated into one of the end caps of the motor assembly, e.g., integrated into front end cap 103 as shown, is a coolant intake 121. The coolant can be non-gaseous and have thermal and mechanical properties suitable for a liquid motor coolant, e.g., high heat capacity, high break-down temperature and a relatively low viscosity. Additionally, as the coolant flows between the rotor and stator as well as a small portion of the rotor shaft and the end cap, the coolant can also be a good lubricant and can be electrically non-conductive. Accordingly, in at least one embodiment oil is used as the coolant (e.g., an automatic transmission fluid).

In the embodiment illustrated in FIG. 1, the coolant passing into intake 121 can be pressurized via coolant pump 123 through coolant injection tube 125. In this embodiment coolant pump 123 is an external pump, for example an electric pump, although other types of pumps may be used such as a mechanical pump powered by rotor shaft 113. Coolant intake 121 is coupled to a coolant passageway 127. Passageway 127 connects the intake 121 to one or more injection nozzles 129 and from there into region 131 of the motor enclosure. The injection nozzles 129 can be located at either end of the stator 117 and at or near the top of the motor casing 101. As a result of this nozzle placement, coolant flowing out of the injection nozzles 129 can pass over the stator 117 and stator end windings 133. For example, the stator end windings 133 can be said to be splashed with the coolant during operation. The stator end windings 133 are here free of any varnish, resin, or other bulk material. Rather, the wires of the stator windings have individual insulation, and no secondary insulation is applied to the wires within the stator end windings 133. As a result, the coolant flowing out of the injection nozzles 129 can pass between the wires in the stator end windings 133. The stator 117 may be formed from stacked laminations that form slots for the wires of the stator windings. Within these slots, by contrast, varnish may be applied so as to contact both the laminations and the wires of the windings in the slots. This approach can improve the thermal performance of the motor and integrated cooling system 100.

At least some of the coolant flowing through injection nozzles 129 can be distributed throughout the motor enclosure by the spinning rotor 111 and rotor end-rings. The coolant can eventually pass through one or more casing output apertures 135 located at or near the bottom of the casing and be collected in reservoir 137. Reservoir 137 is coupled to coolant pump 123. Heat absorbed by the coolant can then be transferred to the ambient environment or to another thermal system (e.g., refrigeration system) using any of a variety of well-known techniques.

Figure 2:
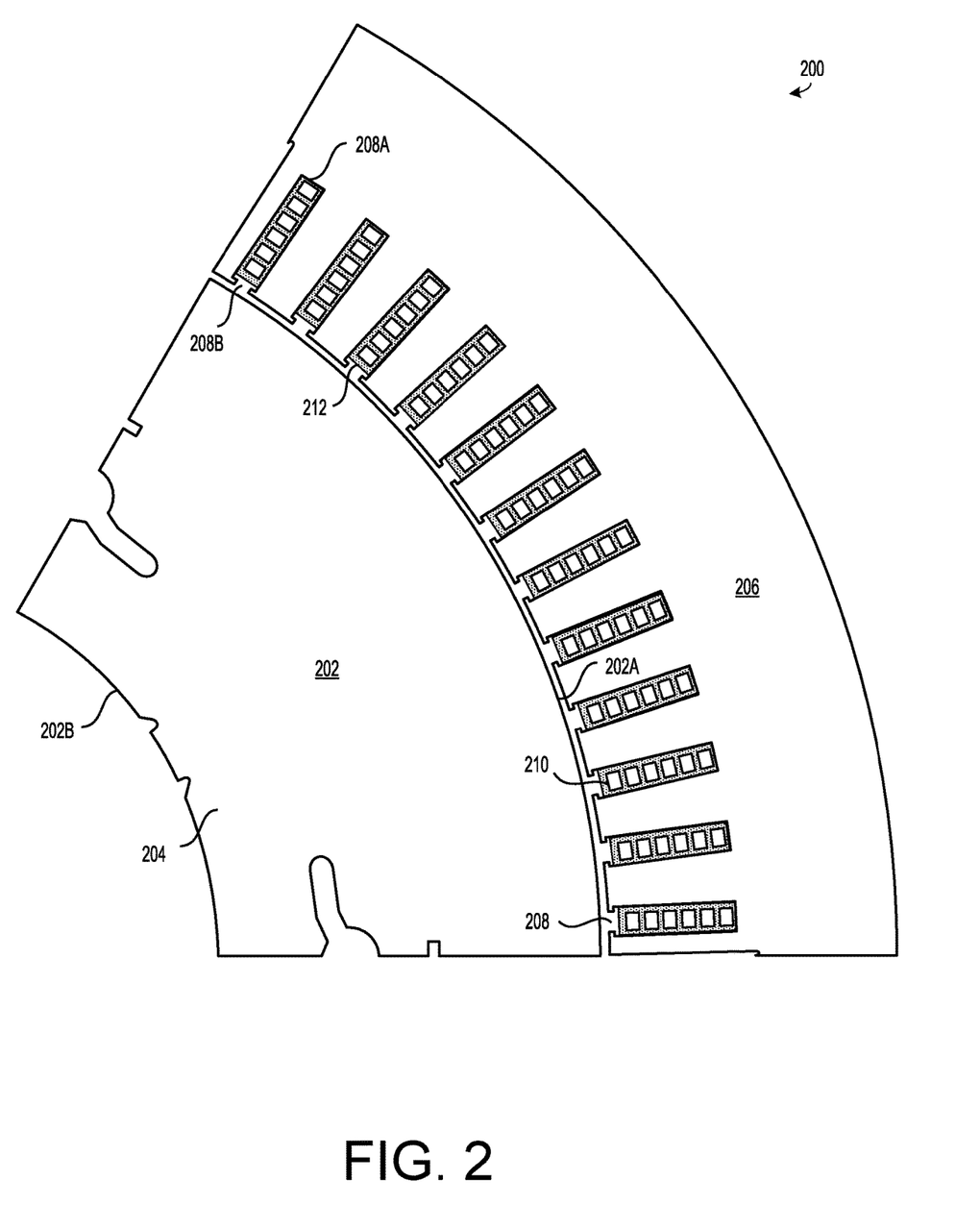
FIG. 2 shows a cross-section view of an example of one sixth of an electric motor.

FIG. 2 shows a cross-section view of an example of one sixth of an electric motor 200. Here, only the one sixth is being shown, and the remainder of the electric motor 200 is being omitted, for clarity. As such, the components of the electric motor 200 that are described below may additionally include other features and/or parts that are not visible here. The electric motor 200 can be used with one or more other examples described elsewhere herein.

The electric motor 200 includes a rotor 202. The rotor 202 is here shown to have an outer circumference 202A (sometimes referred to as an outer diameter), and an inner circumference 202B (sometimes referred to as an inner diameter). The rotor 202 is configured to be driven by a rotating magnetic field so as to rotate about a central axis (not shown). For example, the rotor 202 can have a so-called active core where a differential (not shown) is fully or partially integrated within an inside of a rotor shaft.

The rotor 202 can be designed according to any of multiple operational principles. In some implementations, the rotor 202 is formed from laminations 204 that are stacked so as to be essentially perpendicular to the axis of rotation. For example, the laminations 204 can be made of a metal, including, but not limited to, a steel material.

The rotor 202 can be designed to have multiple poles that facilitate the rotor 202 to be driven by a rotating magnetic field during operation of the electric motor 200. The poles of the rotor 202 can be generated in different ways. In some implementations, permanent magnets can be included in the rotor 202. Other approaches can be used.

The electric motor 200 includes a stator 206 that surrounds the rotor 202. The stator 206 is formed from a stack of laminations and includes a number of slots 208. Each of the slots 208 is configured to hold wires 210 that form a stator winding of the stator 206. The stator 206 can have a number of the wires 210 in each of the slots 208 to form slot windings. The wires 210 can have any suitable shape. In some implementations, the wires 210 have a rectangular cross-section profile (e.g., as shown). In some implementations, the wires 210 have a rounded cross-section profile. The wires 210 can be arranged within the slot 208 in one or more ways. In some implementations, each of the slots 208 is configured to hold a number of the wires 210 in a linear arrangement between a back 208A of the slot 208 and a front 208B of the slot 208. The front 208B of the slot 208 can be located adjacent an air gap between the stator 206 and the rotor 202, the air gap formed at a stator bore of the stator 206 that accommodates the rotor 202.

Each of the slots 208 has varnish 212. The varnish 212 is positioned within each of the slots 208 so as to contact the laminations of the stator 206 and the wires 210 within that slot 208. The varnish 212 does not extend beyond the front 208B of the slot 208. The varnish 212 also does not cover any of the end windings (not shown) of the stator 206.

Figure 3A:
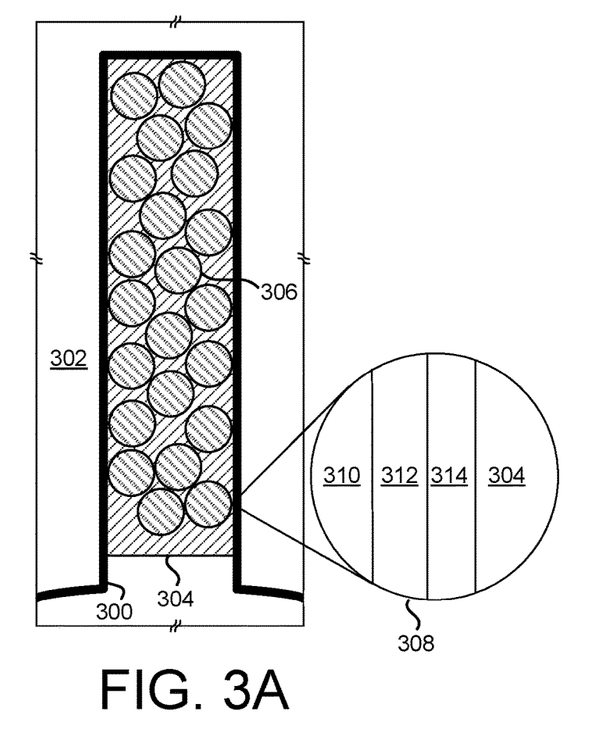
FIG. 3A shows a cross section view of an example of a stator slot in a stator lamination.

FIG. 3A shows a cross section view of an example of a stator slot 300 in a stator lamination 302. Only one instance of the stator slot 300, and only a portion of the stator lamination 302 nearest the stator slot 300, are shown here for simplicity. The present example can be used with one or more other examples described elsewhere herein. Each of the stator slots 300 has varnish 304. The varnish 304 is positioned within each of the slots 300 so as to contact the laminations of the stator and wires 306 within that stator slot 300. The stator can have a number of the wires 306 in each of the stator slots 300 to form slot windings. The wires 306 can have any suitable shape. In some implementations, the wires 306 have a rounded cross-section (e.g., as shown). In some implementations, the wires 306 have a rectangular cross-section. The varnish 304 does not extend beyond the front of the stator slot 300. The varnish 304 also does not cover any of the end windings (not shown) of the stator.

An enlargement 308 shows a partial cross section of the interface between the wires 306 and the varnish 304. This example illustrates that the wires 306 can have individual insulation. In some implementations, a material 310 of the wires 306 has conductivity (e.g., the material 310 is a metal, such as copper). A layer 312 can cover an external surface of the material 310. In some implementations, the layer 312 can include enamel. A layer 314 can cover an external surface of the layer 312. In some implementations, the layer 314 can include a resin. For example, a semi-crystalline thermoplastic material can be used for the layer 314. The layer 312 and/or 314 can provide electrical insulation for the wires 306. The varnish 304, moreover, can contact at least some of the external surface of the layer 314.

Figure 3B:
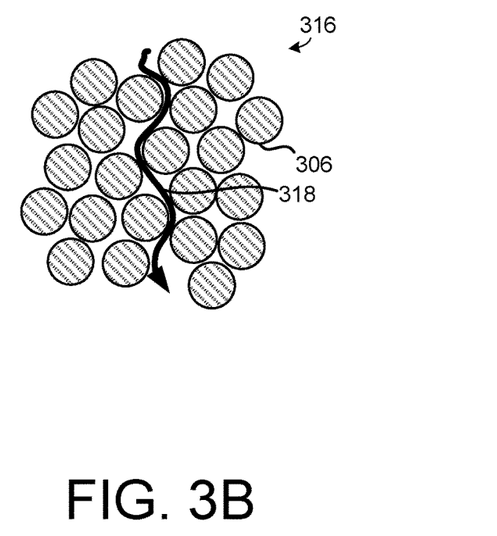
FIG. 3B shows a cross section view of an example of an end winding in a stator.

FIG. 3B shows a cross section view of an example of an end winding 316 in a stator. The end winding 316 can be used with one or more other examples described elsewhere herein. The present illustration shows cross sections of the individual instances of the wires 306. The end winding 316 can have any of multiple configurations, including, but not limited to, a hairpin winding or a continuous wave pattern. The individual shapes of the sections through the respective wires 306 can be different and need not all be identical as shown here for simplicity.

The wires 306 have individual insulation (see, e.g., FIG. 3A). In the end winding 316 no varnish is applied. For example, the varnish 304 (FIG. 3A) that contacts the slot windings does not contact the end winding 316. As such, multiple gaps may exist between the wires 306 of the end winding 316. This can allow a coolant (e.g., oil) to pass between the wires 306 of the end winding 316. Here, a path 318 illustrates one possible way that coolant can travel through the end winding 316. Along the path 318, the coolant passes by a greater number of the wires 306, and/or touches a greater surface area of the wires 306, than would have been the case if the end winding 316 had been varnished. As such, having the end winding 316 free of varnish can improve the thermal performance of the electric motor.

Figure 4:
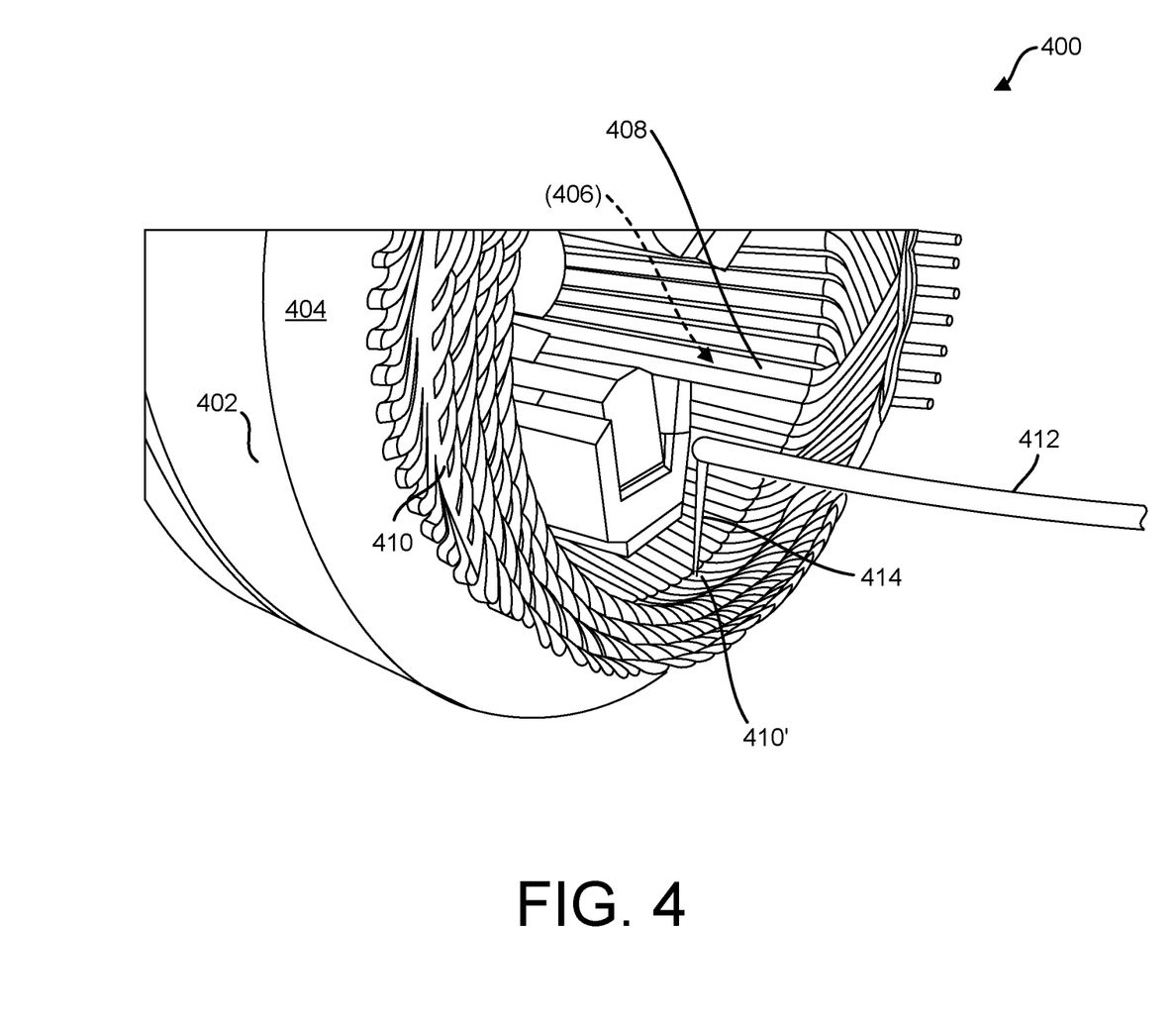
FIG. 4 shows an example of applying varnish only to slots in a stator, and not to end windings.

FIG. 4 shows an example 400 of applying varnish only to slots in a stator, and not to end windings. The example 400 can be used with one or more other examples described elsewhere herein. The example 400 shows a portion of a stator 402 to which varnish is presently being applied. The stator 402 has laminations 404 forming slots 406 that are presently covered by a protective layer 408. For example, the protective layer 408 can include an insulation paper having dielectric strength. The stator 402 has an end winding 410. For example, the end winding 410 can be a hairpin winding or a continuous wave pattern winding. A nozzle 412 is presently dispensing varnish 414 in liquid form that impinges on a wire 410' extending from the end winding 410. The varnish 414 can impinge at a point where the wire 410' enters one of the slots 406. In some implementations, the stator 402 can be preheated before the varnish application process. The varnish 414 enters the one of the slots 406 into which the wire 410' extends (which slot may contain multiple wires) and fills some or all gaps that may extend between the laminations 404 and the slot windings in that slot. The varnish 414 does not impinge on the end winding 410. As such, the wires of the end winding 410, which are individually insulated, are free of the varnish 414. For example, the heating of the stator 402 for the varnish application process can cause the varnish 414 to flow toward the center of the stator 402, which may have a relatively higher temperature, and not flow toward the end winding 410, which may have a relatively lower temperature.

Figure 5:
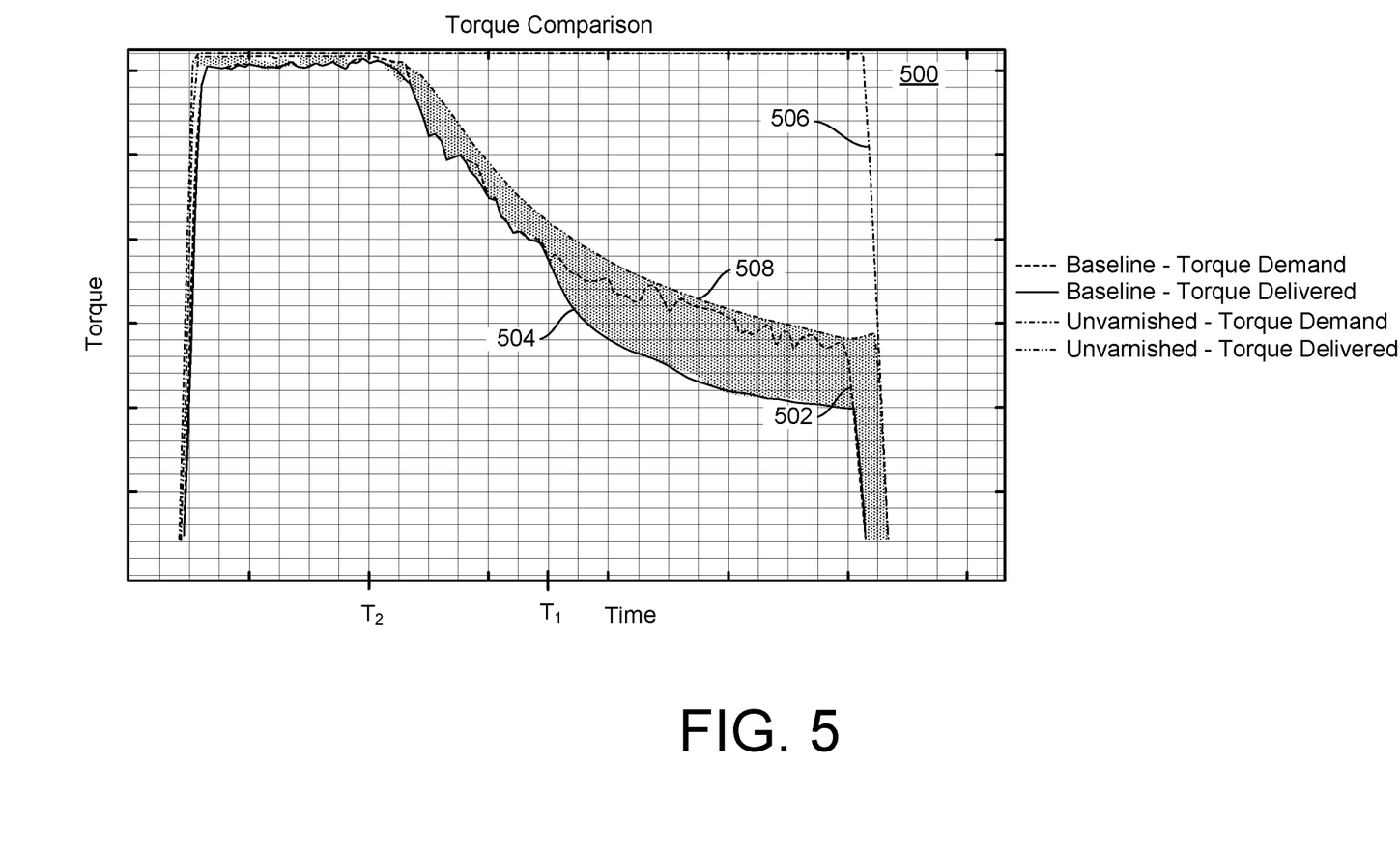
FIG. 5 is a diagram with examples of graphs showing torque over time for electric motors.

FIG. 5 is a diagram 500 with examples of graphs showing torque over time for electric motors. The diagram 500 can characterize one or more other examples described elsewhere herein. The diagram 500 shows torque on the vertical axis as a function of time indicated on the horizontal axis. Some portions of the diagram 500 are omitted for simplicity.

Graphs 502 and 504 reflect torque with regard to an electric motor that has varnished end windings. The graph 502 can be referred to as a baseline torque demand, and the graph 504 can be referred to as a baseline torque delivered. For example, at a time $T_1$ the graph 504 can depart downward from the graph 502 due to derating applied by a control algorithm.

Graphs 506 and 508 reflect torque with regard to an electric motor that has unvarnished end windings. The graph 506 can be referred to as an unvarnished torque demand, and the graph 508 can be referred to as an unvarnished torque delivered. Here, the graph 506 illustrates that the drive unit is being asked to produce its maximum torque at every speed. At a time $T_2$ the graph 508 can depart downward from the graph 506 due to field weakening. The graph 508 has greater torque than the graph 504 essentially everywhere in the diagram 500. As such, the unvarnished end windings with which the graph 508 is associated increase the performance of the electric motor.

Figure 6:
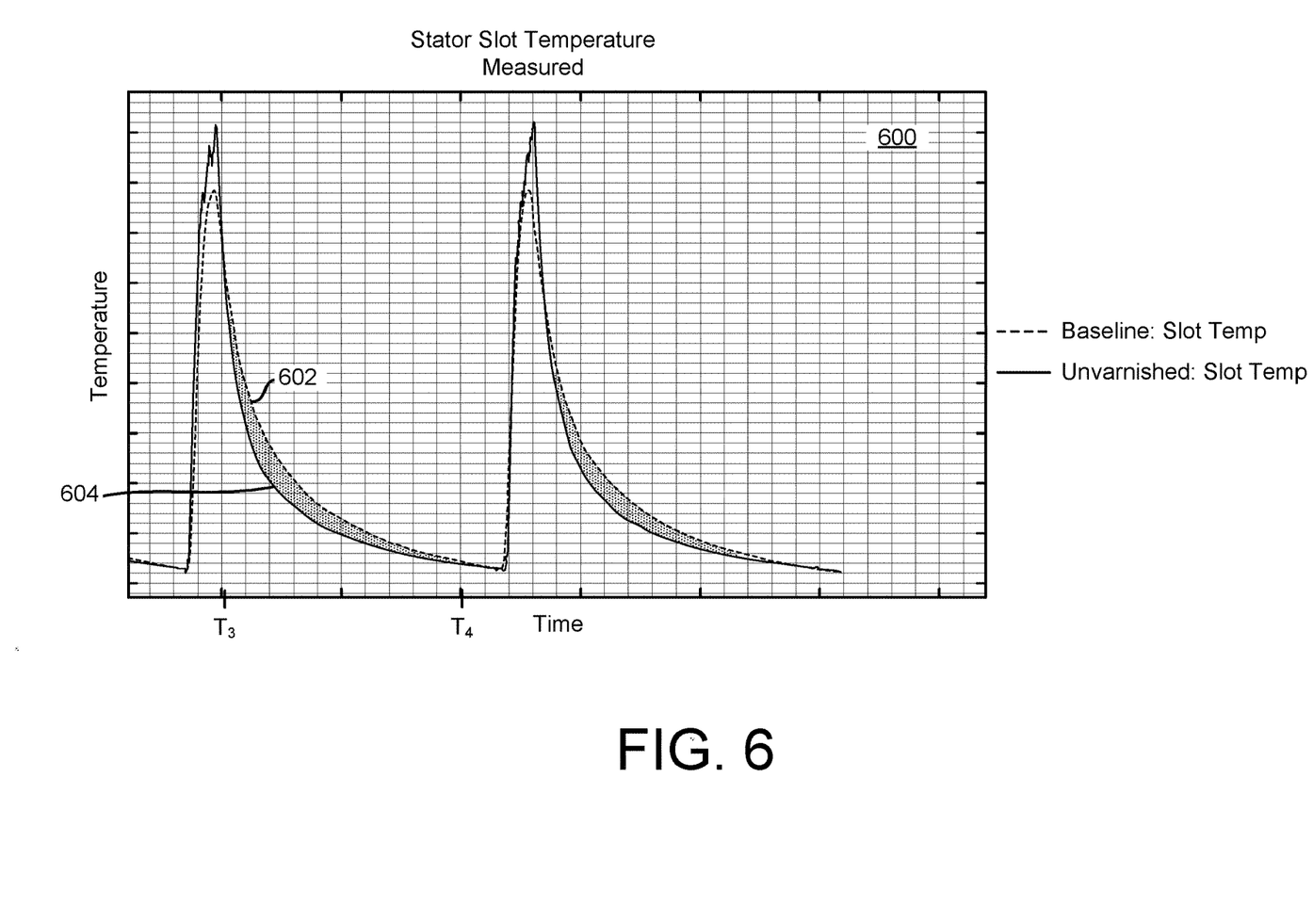
FIG. 6 is a diagram with examples of graphs showing stator slot temperature over time for electric motors.

FIG. 6 is a diagram 600 with examples of graphs showing stator slot temperature over time for electric motors. The diagram 600 can characterize one or more other examples described elsewhere herein. The diagram 600 shows temperature on the vertical axis as a function of time indicated on the horizontal axis. Some portions of the diagram 600 are omitted for simplicity.

Graph 602 reflects temperature with regard to an electric motor that has varnished end windings. The graph 602 can be referred to as a baseline slot temperature. Graph 604 reflects temperature with regard to an electric motor that has unvarnished end windings. The graph 604 can be referred to as an unvarnished slot temperature. From a time $T_3$ until at least a time $T_4$ the graph 604 departs downward from the graph 602, indicating a lower slot temperature in the electric motor with unvarnished end windings. As such, the unvarnished end windings with which the graph 604 is associated increase the performance of the electric motor. The fact that, shortly before the time $T_3$, the graph 602 indicates a lower temperature than the graph 604 can be attributed to the varnish in the electric motor of the graph 602 serving as a thermal mass that masks the heating of the wires. As such, the wires of the electric motor of the graph 602 may have reached an equal temperature to that of the wires of the electric motor of the graph 604 in the region shortly before the time $T_3$.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An electric motor comprising:
   a rotor;
   a stator comprising a stack of laminations, wherein windings of the stator comprise wires that have individual insulation, the wires forming slot windings positioned in slots of the stator, the wires further forming end windings positioned outside the slots at each end of the stator;
   varnish in the slots of the stator, the varnish contacting the laminations and the slot windings, and wherein the varnish does not contact the end windings of at least one of the ends of the stator; and
   a cooling system to apply liquid coolant to at least the end windings, wherein the liquid coolant passes between the wires of the end windings.

2. The electric motor of claim 1, wherein the varnish does not contact either of the end windings.

3. The electric motor of claim 1, wherein a cross section profile of the wires is rectangular.

4. The electric motor of claim 1, wherein a cross section profile of the wires is round.

5. The electric motor of claim 1, wherein the end windings form a continuous wave pattern relative to the slots of the stator.

6. The electric motor of claim 1, wherein the end windings are hairpin windings.

7. The electric motor of claim 1, wherein the individual insulation comprises at least a first layer that covers each of the wires, and a second layer that covers the first layer.

8. The electric motor of claim 7, wherein the first layer comprises enamel.

9. The electric motor of claim 8, wherein the second layer comprises a resin.

10. The electric motor of claim 1, wherein the varnish comprises a resin.

11. The electric motor of claim 1, wherein multiple gaps exist between the wires of the end winding, and wherein the liquid coolant passes in the multiple gaps between the wires of the end windings.

12. The electric motor of claim 11, wherein the multiple gaps form at least one path through the end winding, and wherein the liquid coolant passes through the end winding along the path.

13. The electric motor of claim 12, wherein along the path, the liquid coolant touches all of the end windings.

14. The electric motor of claim 12, wherein along the path, the liquid coolant touches an entire surface area of the end windings.

15. An electric motor comprising:
    a rotor;
    a stator comprising a stack of laminations, wherein windings of the stator comprise wires that have individual insulation, the wires forming slot windings positioned in slots of the stator, the wires further forming end windings positioned outside the slots at each end of the stator;
    varnish in the slots of the stator, the varnish contacting the laminations and the slot windings; and
    means for applying liquid coolant to at least the end windings so that the liquid coolant passes between the wires of the end windings.

* * * * *